(12) United States Patent
Lai

(10) Patent No.: US 9,122,132 B2
(45) Date of Patent: Sep. 1, 2015

(54) MOTOR, HOLDER AND IMAGE CAPTURE DEVICE USING SAME

(71) Applicant: HON HAI PRECISION INDUSTRY CO., LTD., New Taipei (TW)

(72) Inventor: Cheng-Yi Lai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/162,771

(22) Filed: Jan. 24, 2014

(65) Prior Publication Data

US 2014/0219647 A1 Aug. 7, 2014

(30) Foreign Application Priority Data

Feb. 5, 2013 (TW) .............................. 102104329 A

(51) Int. Cl.
| | |
|---|---|
| *G03B 17/00* | (2006.01) |
| *F16H 59/00* | (2006.01) |
| *F16H 61/00* | (2006.01) |
| *F16H 63/00* | (2006.01) |
| *F16H 27/00* | (2006.01) |
| *F16H 29/00* | (2006.01) |
| *G03B 17/56* | (2006.01) |
| *F16H 37/06* | (2006.01) |

(52) U.S. Cl.
CPC ............ *G03B 17/561* (2013.01); *F16H 37/065* (2013.01); *Y10T 74/18784* (2015.01); *Y10T 74/19251* (2015.01)

(58) Field of Classification Search
USPC .......... 396/428, 427; 348/143, 373; 74/89.13, 74/335

See application file for complete search history.

(56) References Cited

U.S. PATENT DOCUMENTS

| 4,596,374 A | 6/1986 | Thompson et al. |
| 4,995,278 A * | 2/1991 | Huang .......................... 74/89.28 |

FOREIGN PATENT DOCUMENTS

| CN | 2728088 Y | 9/2005 |
| CN | 201156685 Y | 11/2008 |
| CN | 202127598 U | 2/2012 |
| CN | 202215680 U | 5/2012 |
| TW | I255778 B | 6/2006 |

* cited by examiner

*Primary Examiner* — Rochelle-Ann J Blackman

(74) *Attorney, Agent, or Firm* — Novak Druce Connolly Bove + Quigg LLP

(57) ABSTRACT

A motor for providing rotational movement along different directions simultaneously includes a stator, a rotor, a power shaft rotated together with the rotor, a first driving shaft, a first transmission gear located on the first driving shaft, a second driving shaft, and a second transmission gear located on the second driving shaft. The power shaft includes at least one driving gear located on an end portion of the power shaft. The first transmission gear and the second transmission gear engage with the driving gear to drive the first driving shaft and the second driving shaft to rotate, respectively.

13 Claims, 10 Drawing Sheets

MOTOR, HOLDER AND IMAGE CAPTURE DEVICE USING SAME

FIELD

The disclosure generally relates to driving techologies, and particularly to a motor for driving a holder, and an image capture device using the holder.

BACKGROUND

Generally, one motor can only rotate a component along one direction. Thus, a machine needs to employ more than one motor to execute a number of rotational motions, which increases a bulk and cost of the machine.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

Figure 1:
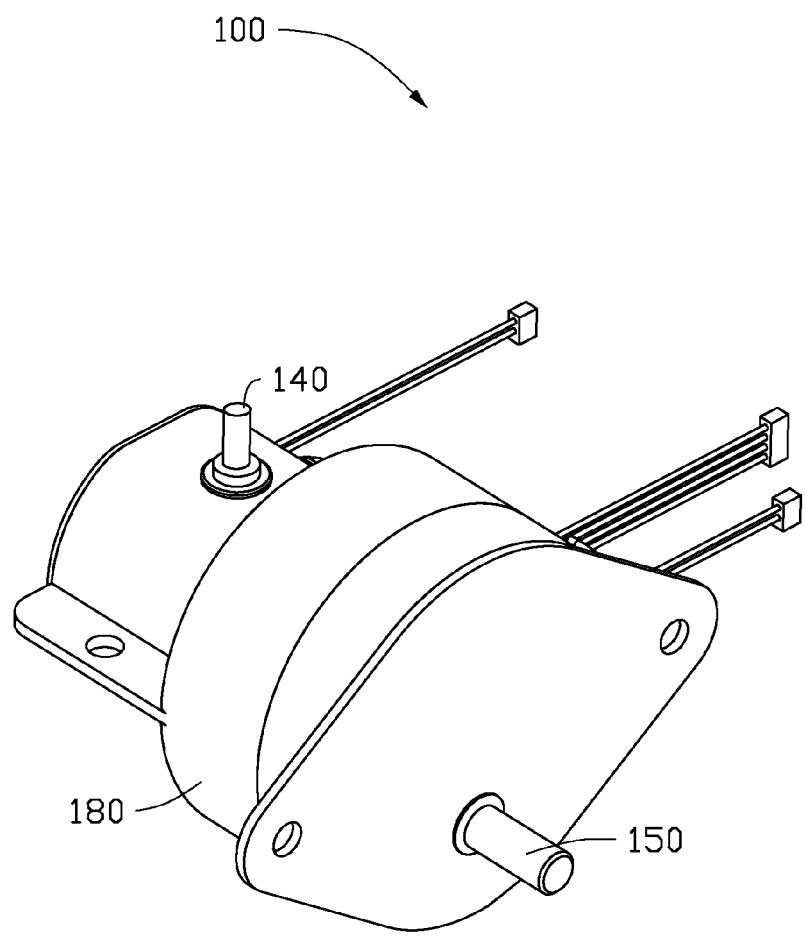
FIG. 1 is an isometric, assembled view of a first embodiment of a motor.
Figure 2:
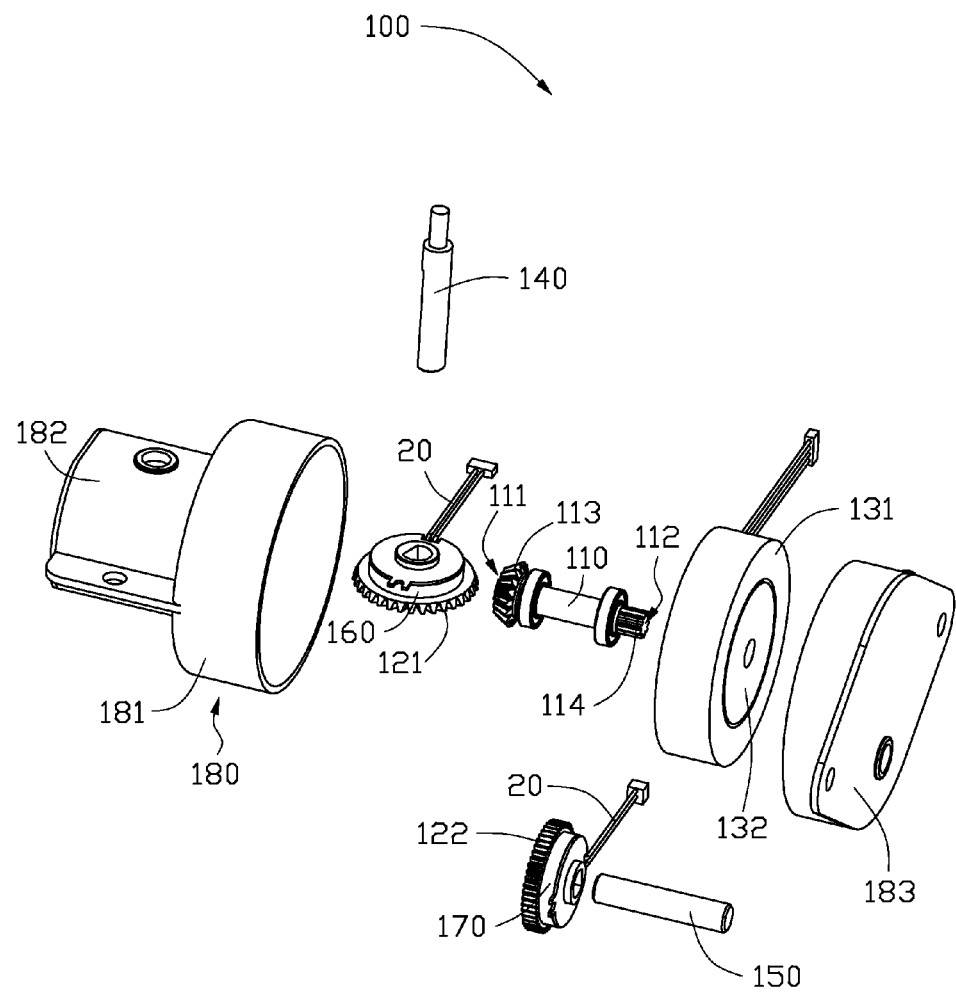
FIG. 2 is an isometric, exploded view of the motor of FIG. 1.
Figure 3:
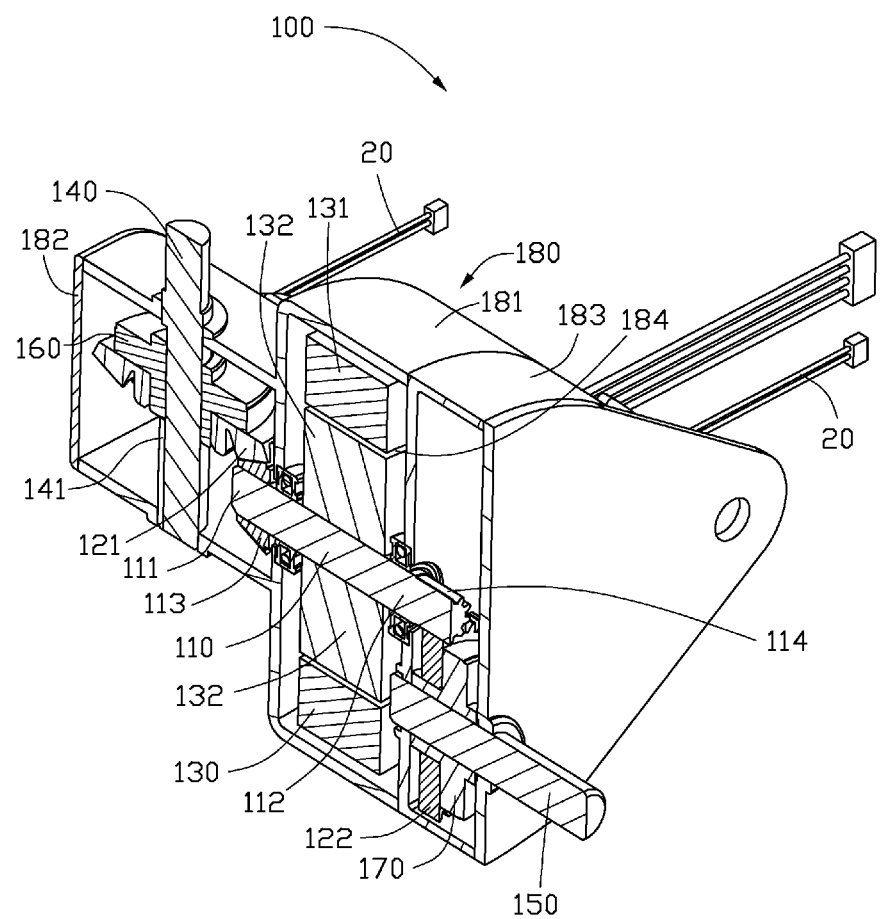
FIG. 3 is an isometric, cutaway view of the motor of FIG. 1.

FIGS. 1, 2, and 3 show a first embodiment of a motor 100. The motor 100 includes a stator 131, a rotor 132, a power shaft 110, a first transmission gear 121, a second transmission gear 122, a first electromagnetic loop 160, a second electromagnetic loop 170, a first driving shaft 140, a second driving shaft 150, and a housing 180.

The housing 180 includes a first room 181, a second room 182, and a third room 183. The second room 182 and the third room 183 are correspondingly located at opposite sides of the first room 181. The stator 131 and the rotor 132 are received in the first room 181. The first transmission gear 121, the first electromagnetic loop 160, and the first driving shaft 140 are received in the second room 182. The second transmission gear 122, the second electromagnetic loop 170, and the second driving shaft 150 are received in the third room 183. The power shaft 110 includes a first end portion 111, a second end portion 112 opposite from the first end 111, a first driving gear 113 located on the first end 111, and a second driving gear 114 set on the second end portion 112. The power shaft 110 is received through the first room 181. The first end portion 111 is received into the second room 182 and engages with the first transmission gear 121 via the first driving gear 113. The second end portion 112 is received into the third room 183 and engages with the second transmission gear 122 via the second driving gear 114. A part of the first driving shaft 140 extends out of the second room 182 via a first output hole (not labeled) defined in a sidewall of the second room 182. A part of the second driving shaft 150 extends out of the third room 183 via a second output hole (not labeled) defined in a sidewall of the third room 183.

The stator 131 defines a receiving space 184. The rotor 132 is received in the receiving space 184 and encircled by the stator 131. The rotor 132 rotates when the motor 100 is turned on. The power shaft 110 is tightly sleeved by the rotor 132 and driven to rotate by the rotor 132.

The first transmission gear 121 is driven to rotate by the first driving gear 113 of the power shaft 110. The first electromagnetic loop 160 is tightly sleeved by the first transmission gear 121 and rotates together with the first transmission gear 121. The first electromagnetic loop 160 is sleeved around the first driving shaft 140. The first electromagnetic loop 160 is controlled to grasp or release the first driving shaft 140 by a controlling signal transmitted from a wire 20. The first driving shaft 140 is driven to rotate by the first transmission gear 121 when the first electromagnetic loop 160 is controlled to grasp the first driving shaft 140. The first driving shaft 140 is stopped from rotating when the first electromagnetic loop 160 is controlled to release the first driving shaft 140. Thus, the controlling signal transmitted by the wire 20 controls whether the first driving shaft 140 is rotated or not.

In this embodiment, the power shaft 110 extends along a horizontal direction, and the first driving shaft 140 extends along a vertical direction. The first driving gear 113 and the first transmission gear 121 are bevel gears. The first transmission gear 121 engages with the first driving gear 113 to transform a rotational motion about the horizontal direction into a rotational motion about the vertical direction. The first driving shaft 140 includes a holding flange 141 extending from an outer surface thereof. Thus, the first electromagnetic loop 160 and the first transmission gear 121 are held on the holding flange 141 when the first electromagnetic loop 160 releases the first driving shaft 140.

Similarly, the second transmission gear 122 is driven to rotate by the second driving gear 114 of the power shaft 110. The second electromagnetic loop 170 is tightly sleeved by the second transmission gear 122 and rotates together with the second transmission gear 122. The second electromagnetic loop 170 is sleeved around the second driving shaft 150. The second electromagnetic loop 170 is controlled to grasp or release the second driving shaft 150 by a controlling signal transmitted from a second wire 20. The second driving shaft 150 is driven to rotate by the second transmission gear 122 when the second electromagnetic loop 170 is controlled to grasp the second driving shaft 150, and the second driving shaft 150 is stopped from rotating when the second electromagnetic loop 170 is controlled to release the second driving shaft 150. Thus, the controlling signal controls whether the second driving shaft 150 rotates or not.

In this embodiment, the second driving shaft 150 is substantially parallel to the power shaft 110. The second driving gear 114 and the second transmission gear 122 are spur gears.

Therefore, the motor 100 can selectively provide one or more rotational motions about different directions simultaneously.

Figure 4:
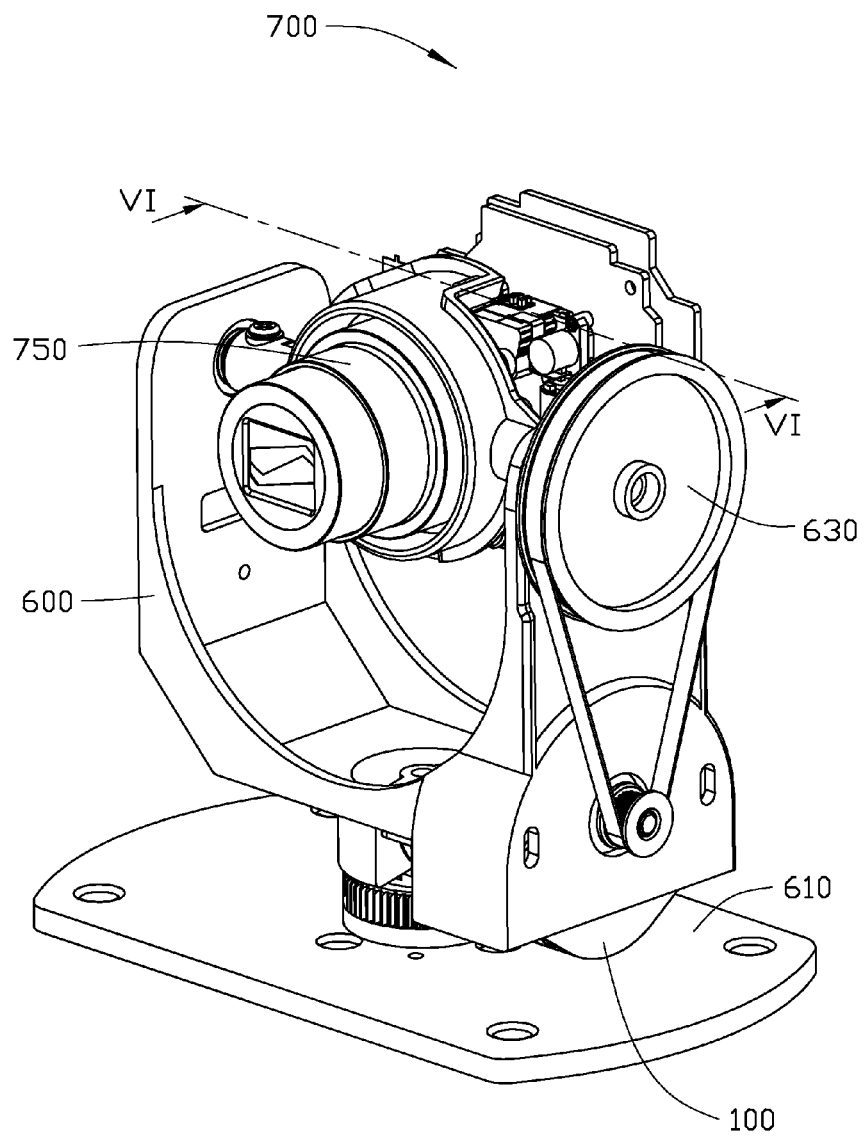
FIG. 4 is an isometric, assembled view of an image capture device using the motor of FIG. 1.
Figure 5:
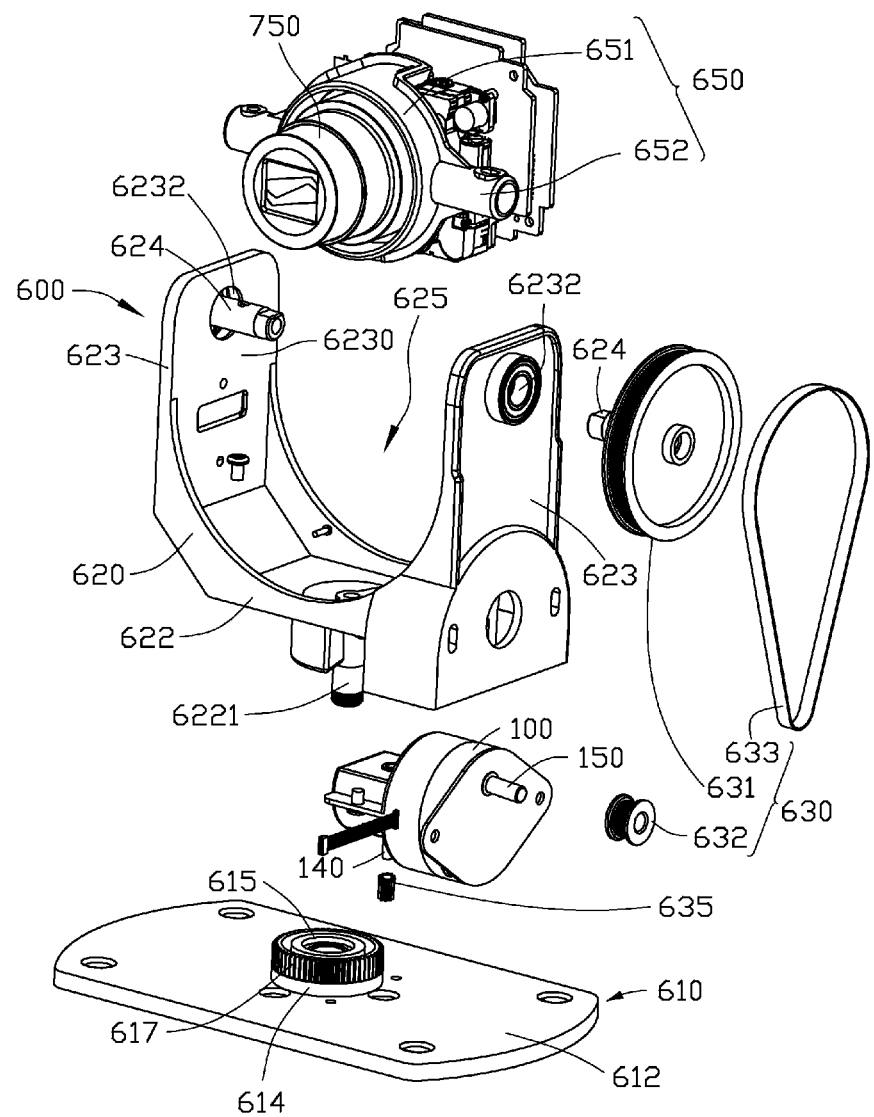
FIG. 5 is an isometric, exploded view of the image capture device of FIG. 4.
Figure 6:
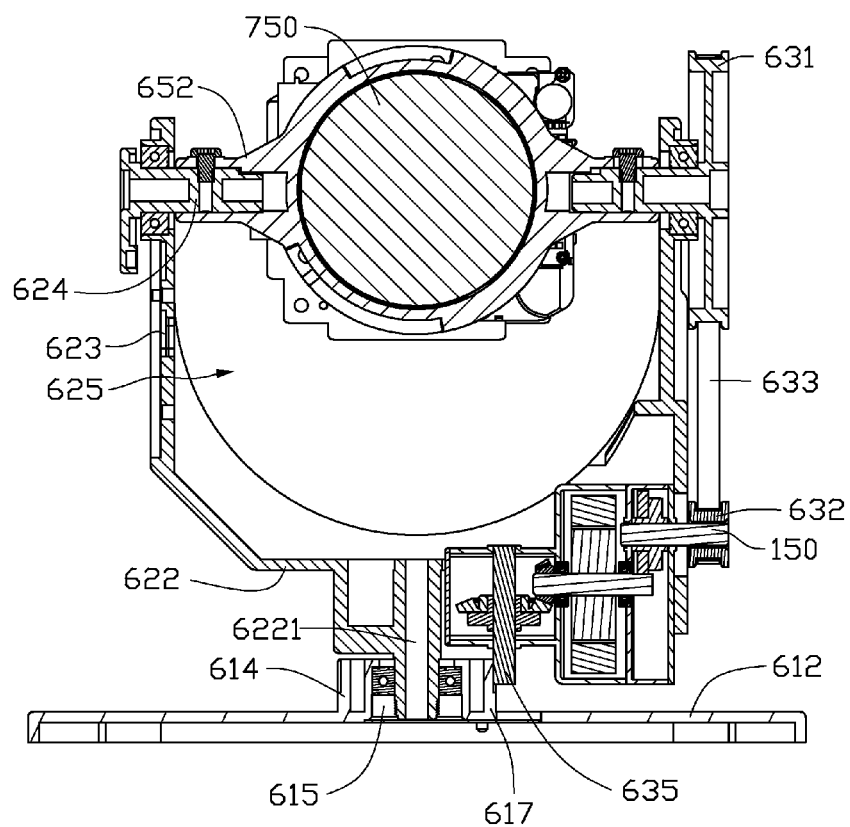
FIG. 6 is an isometric, cross-sectional view of the image capture device of FIG. 4, taken along line VI-VI.

FIGS. 4, 5, and 6 show an image capture device 700 using the first embodiment of the motor 100. The image capture device 700 includes a holder 600, a camera 750, and the motor 100 to the holder 600. The camera 750 is connected to the holder 600. The holder 600 is driven by the motor 100 to rotate to adjust a shooting direction of the camera 750.

The holder 600 includes a base 610, a pan bracket 620, a tilt bracket 650, and a transmission mechanism 630. The base 610 includes a substrate 612 and a connecting pillar 614 located on the substrate 612. A substantially central portion of the connecting pillar 614 defines a connecting hole 615, and an outer circumferential surface of the connecting pillar 614 forms a number of teeth 617.

The pan bracket 620 includes a base board 622, a connecting pole 6221, a pair of arms 623, and a pair of rotating shafts 624. The pair of rotating shafts 624 is rotatably connected to the pair of arms 623 correspondingly. The base board 622 is connected between the pair of arms 623, such that the base board 622 and the pair of arms 623 cooperatively define an accommodating space 625. The connecting pole 6221 extends from a bottom surface (not labeled) of the base board 622. Each of the arms 623 includes an inner surface 6230 facing the other arm 623, and defines a receiving hole 6232 adjacent to a distal end of the arm 623. The rotating shafts 624 are rotatably received in the corresponding receiving holes 6232 and received in the accommodating space 625. One of the rotating shafts 624 extends out of the accommodating space 625.

The tilt bracket 650 includes a substantially circular frame 651 and a pair of connecting sleeves 652. The connecting sleeves 652 correspondingly extend from opposite sides of an outer surface of the frame 651.

The transmission mechanism 630 includes a first driving wheel 631, a second driving wheel 632, and a transmission belt 633. A diameter of the first driving wheel 631 is greater than a diameter of the second driving wheel 632.

In assembly, the pan bracket 620 is rotatably connected to the connecting pillar 614 via the connecting pole 6221 being rotatably received in the connecting hole 615. The motor 100 is mounted on the bottom surface of the base board 622 and located below one of the arms 623. A spur gear 635 is sleeved around the first driving shaft 140 and engaged with the teeth 617 of the connecting pillar 614. The second driving wheel 632 is sleeved around the second driving shaft 150. The camera 750 is fixed on the frame 651. The frame 651 and the camera 750 are mounted on the pan bracket 620 by the connecting sleeves 652 being correspondingly sleeved around the rotating shafts 624. The first driving wheel 631 is sleeved on the part of the rotating shaft 624 extending out of the accommodating space 625. The transmission belt 633 connects the first driving wheel 631 to the second driving wheel 632 to transform the rotational motion of the second driving shaft 150 into the rotational motion of the rotating shafts 624.

In use, the camera 750, the tilt bracket 650, and the pan bracket 620 are driven to rotate about the connecting pole 6221 by the first driving shaft 140. The camera 750 and the tilt bracket 650 are driven to rotate about the rotating shafts 624. Thus, the shooting direction of the camera 750 is freely adjustable.

Figure 7:
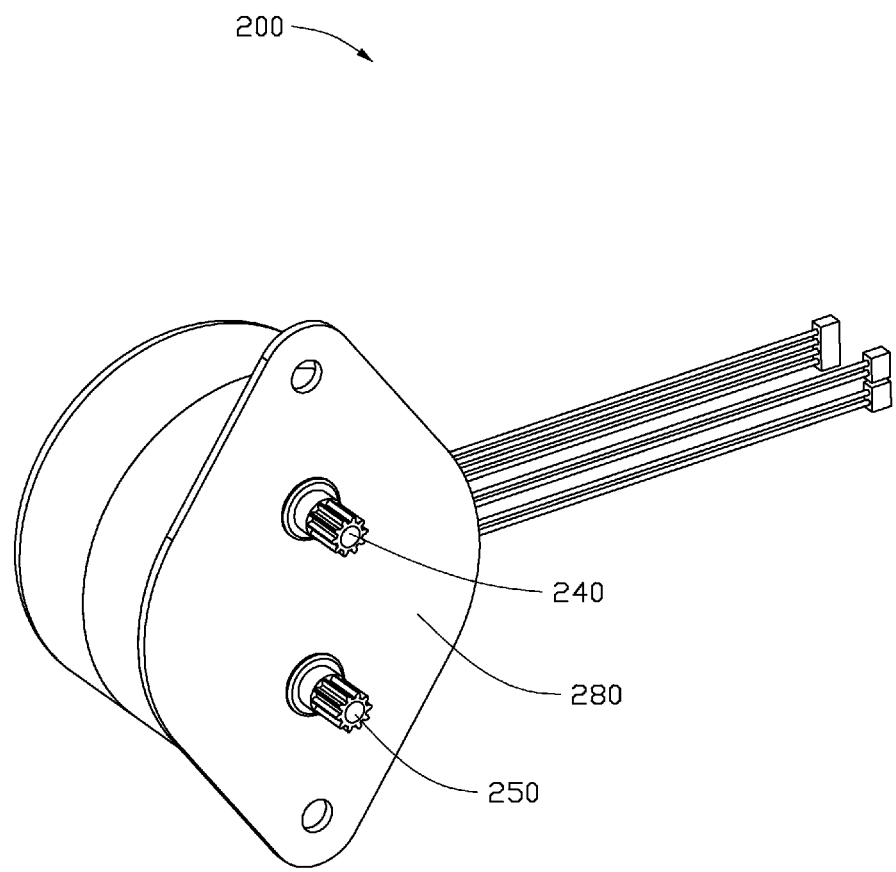
FIG. 7 is an isometric, assembled view of a second embodiment of a motor.
Figure 8:
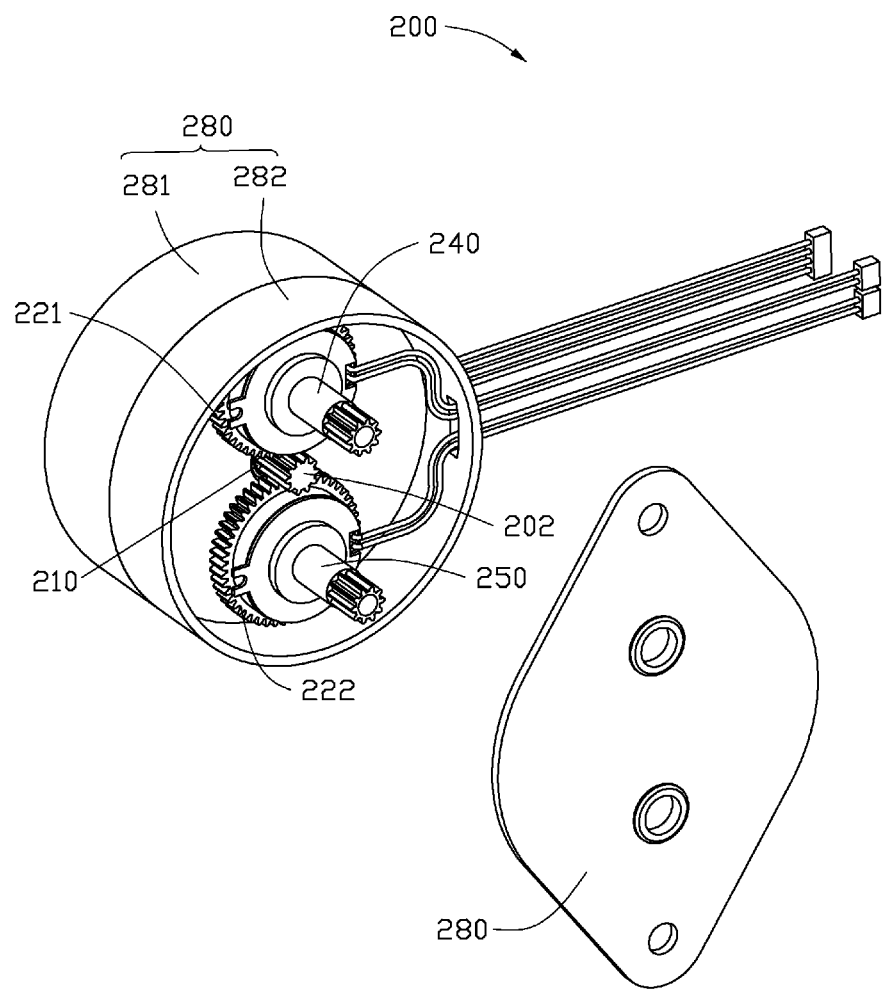
FIG. 8 is an isometric, exploded view of the motor of FIG. 7.

FIGS. 7 and 8 show a second embodiment of a motor 200. The motor 200 of the second embodiment is similar to the motor 100 (as shown in at least FIG. 1) without a difference that is the housing 280 includes a motor room 281 and a gear room 282, the power shaft 210 only includes one driving gear 202 set on one of two opposite ends of the power shaft 210, and the first transmission gear 221 and the second transmission gear 222 correspondingly engage with the driving gear 202 at two opposite sides of the driving gear 202. The stator (not shown) and the rotor (not shown) are received in the motor room 281. The driving gear 202, the first transmission gear 221, the second transmission gear 222 are received in the gear room 282. The first driving shaft 240 and the second driving shaft 250 are parallel to the power shaft 210. Each of the driving gear 202, the first transmission gear 221, and the second transmission gear 222 is a spur gear.

Figure 9:
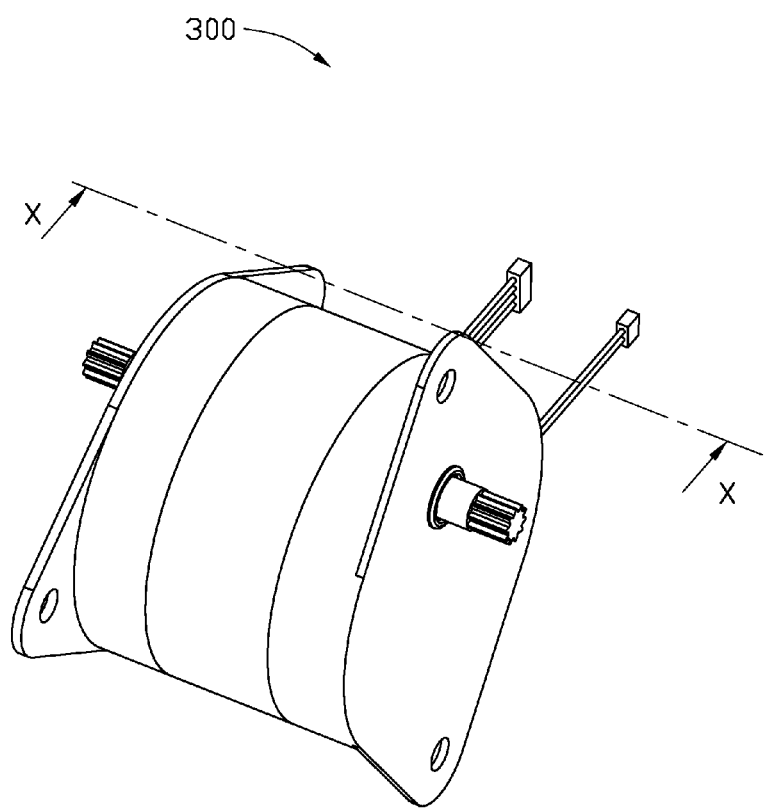
FIG. 9 is an isometric, assembled view of a third embodiment of a motor.
Figure 10:
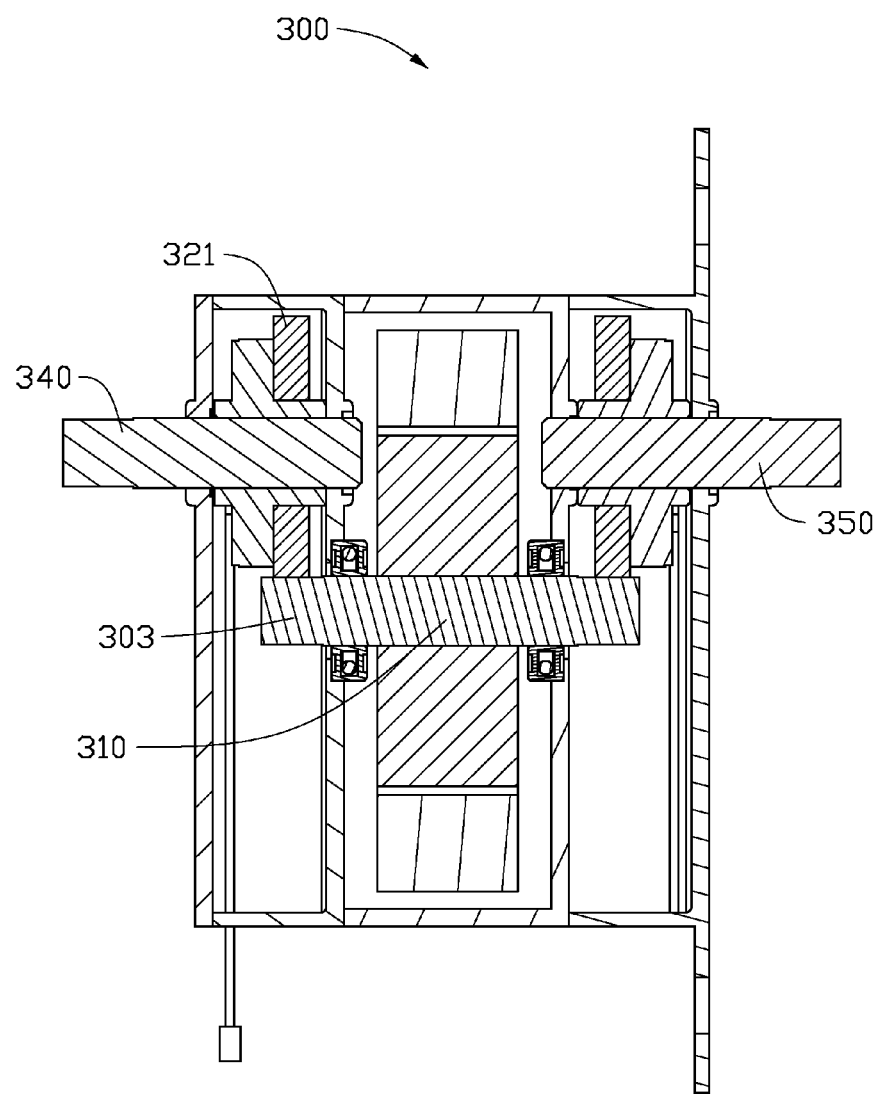
FIG. 10 is an isometric, cross-sectional view of the motor of FIG. 9, taken along line X-X.

FIGS. 9 and 10 show a motor 300 in accordance with a third embodiment of the present disclosure. The motor 300 of the third embodiment is similar to the motor 100 (as shown in at least FIG. 1) of the first embodiment without a difference that is each of the first driving gear 303 and the first transmission gear 321 is a spur gear, the first driving shaft 340 and the second driving shaft 350 are parallel to the power shaft 310, and the first driving shaft 340 and the second driving shaft 350 correspondingly extend along two opposite directions.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments.

What is claimed is:

1. A motor comprising:
a rotor providing a rotational power;
a power shaft sleeved by the rotor and rotating together with the rotor;
a first driving shaft;
a first transmission gear set on the first driving shaft;
a second driving shaft;
a second transmission gear set on the second driving shaft;
a first electromagnetic loop sleeved on the first driving shaft; and
a second electromagnetic loop sleeved on the second driving shaft;
wherein the power shaft comprises at least one driving gear set on an end of the power shaft, and the first transmission gear and the second transmission gear engage with the driving gear to correspondingly drive the first driving shaft and the second driving shaft;
wherein the first transmission gear is tightly sleeved on the first electromagnetic loop, the second transmission gear is tightly sleeved on the second electromagnetic loop, the first electromagnetic loop and the second electromagnetic loop is controlled to correspondingly grasp or release the first driving shaft and the second driving shaft by a controlling signal.

2. The motor of claim 1, wherein the power shaft comprises a first end portion, a second end portion opposite to the first end portion, a first driving gear set on the first end portion, and a second driving gear set on the second end portion, the first transmission gear engages with the first driving gear to drive the first driving shaft, and the second transmission gear engages with the second driving gear to drive the second driving shaft.

3. The motor of claim 2, wherein each of the first driving gear and the first transmission gear is a bevel gear, the first driving shaft is perpendicular to the power shaft, each of the second driving gear and the second transmission gear is a spur gear, and the second driving shaft is parallel to the power shaft.

4. The motor of claim 2, wherein each of the first driving gear, the first transmission gear, the second driving gear, and the second transmission gear is a spur gear, the first driving shaft and the second driving shaft are parallel to the power shaft, and the first driving shaft and the second driving shaft correspondingly extend along two opposite directions.

5. The motor of claim 1, wherein the first transmission gear and the second transmission gear correspondingly engage with the driving gear at two opposite sides of the driving gear, and the first driving shaft and the second driving shaft is parallel to the power shaft.

6. A motor comprising:
a power shaft rotating about a central axis thereof;
a first driving shaft perpendicular to the power shaft;
a first transmission gear set on the first driving shaft;
a second driving shaft parallel to the power shaft;
a second transmission gear set on the second driving shaft;
a first electromagnetic loop sleeved on the first driving shaft; and
a second electromagnetic loop sleeved on the second driving shaft;
wherein the power shaft comprises a first driving gear and a second driving gear correspondingly set on two opposite ends of the power shaft, the first transmission gear engages with the first driving gear to drive the first driving shaft to rotate, the second transmission gear engages with the second driving gear to drive the second driving shaft to rotate,
wherein the first transmission gear is tightly sleeved on the first electromagnetic loop, the second transmission gear is tightly sleeved on the second electromagnetic loop, the first electromagnetic loop and the second electromagnetic loop is controlled to correspondingly grasp or release the first driving shaft and the second driving shaft by a controlling signal.

7. The motor of claim 6, wherein the power shaft comprises a first end portion, a second end portion opposite to the first end portion, the first driving gear set on the first end portion, and the second driving gear set on the second end portion.

8. The motor of claim 7, wherein each of the first driving gear and the first transmission gear is a bevel gear, and each of the second driving gear and the second transmission gear is a spur gear.

9. An image capture device, comprising:
a holder comprising:
a base comprising a connecting pillar;
a pan bracket rotatably connecting to the connecting pillar and comprising a pair of arms;
a tilt bracket located between the pair of arms and rotatably connected to the pair of arms;
a motor mounted on a bottom of the pan bracket, comprising:
a power shaft rotating about a central axis thereof;
a first driving shaft perpendicular to the power shaft;
a first transmission gear set on the first driving shaft;
a second driving shaft parallel to the power shaft; and
a second transmission gear set on the second driving shaft;
a transmission mechanism connecting the second driving shaft with the tilt bracket; and
a camera mounted on the tilt bracket;
wherein the connecting pillar forms a plurality of teeth on a circumferential side surface of the connecting pillar, the power shaft comprises a first driving gear and a second driving gear correspondingly set on two opposite ends of the power shaft, the first transmission gear engages with the first driving gear to drive the first driving shaft, the second transmission gear engages with the second driving gear to drive the second driving shaft, the first driving shaft engages with the teeth via a gear to rotate the pan bracket about the connecting pillar, and the second driving shaft engages with the tilt bracket via the transmission mechanism to rotate the tilt bracket about relative to the pan bracket.

10. The image capture device of claim 9, wherein the motor further comprises:
a first electromagnetic loop sleeved on the first driving shaft; and
a second electromagnetic loop sleeved on the second driving shaft;
wherein the first transmission gear is tightly sleeved on the first electromagnetic loop, the second transmission gear is tightly sleeved on the second electromagnetic loop, the first electromagnetic loop and the second electromagnetic loop is controlled to correspondingly grasp or release the first driving shaft and the second driving shaft by a controlling signal.

11. The image capture device of claim 9, wherein the power shaft comprises a first end portion, a second end portion opposite to the first end portion, the first driving gear set on the first end portion, and the second driving gear set on the second end portion.

12. The image capture device of claim 11, wherein each of the first driving gear and the first transmission gear is a bevel gear, and each of the second driving gear and the second transmission gear is a spur gear.

13. The image capture device of claim 9, wherein the transmission mechanism comprises a first driving wheel, a second driving wheel, and a transmission belt, the pan bracket comprises a pair of rotating shafts rotatably connected to the pair of arms, correspondingly, two opposite ends of the tilt bracket are correspondingly fastened to the rotating shafts, the second driving wheel is sleeved on the second driving shaft, the first driving wheel is sleeved on an end of one of the rotating shafts passing through one of the arms, and transmission belt connects the first driving wheel with the second driving wheel to transform the rotational motion of the second driving shaft to the rotational motion of the rotating shafts.

* * * * *